United States Patent Office 2,730,114
Patented Jan. 10, 1956

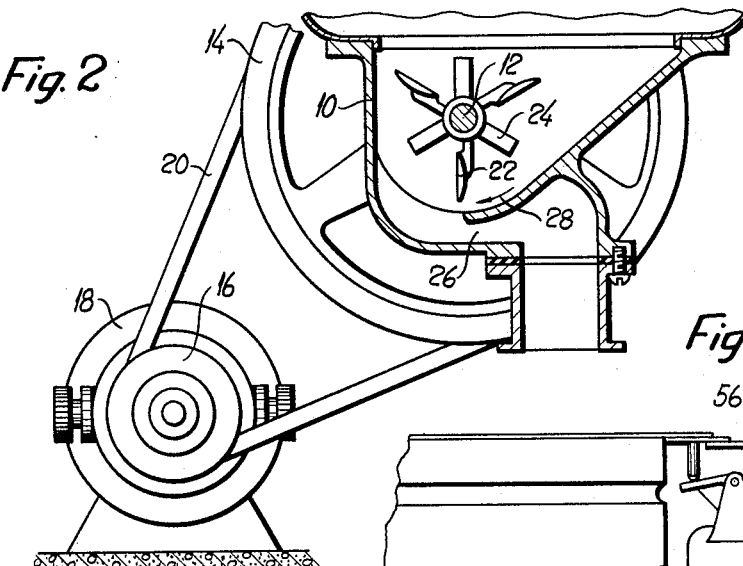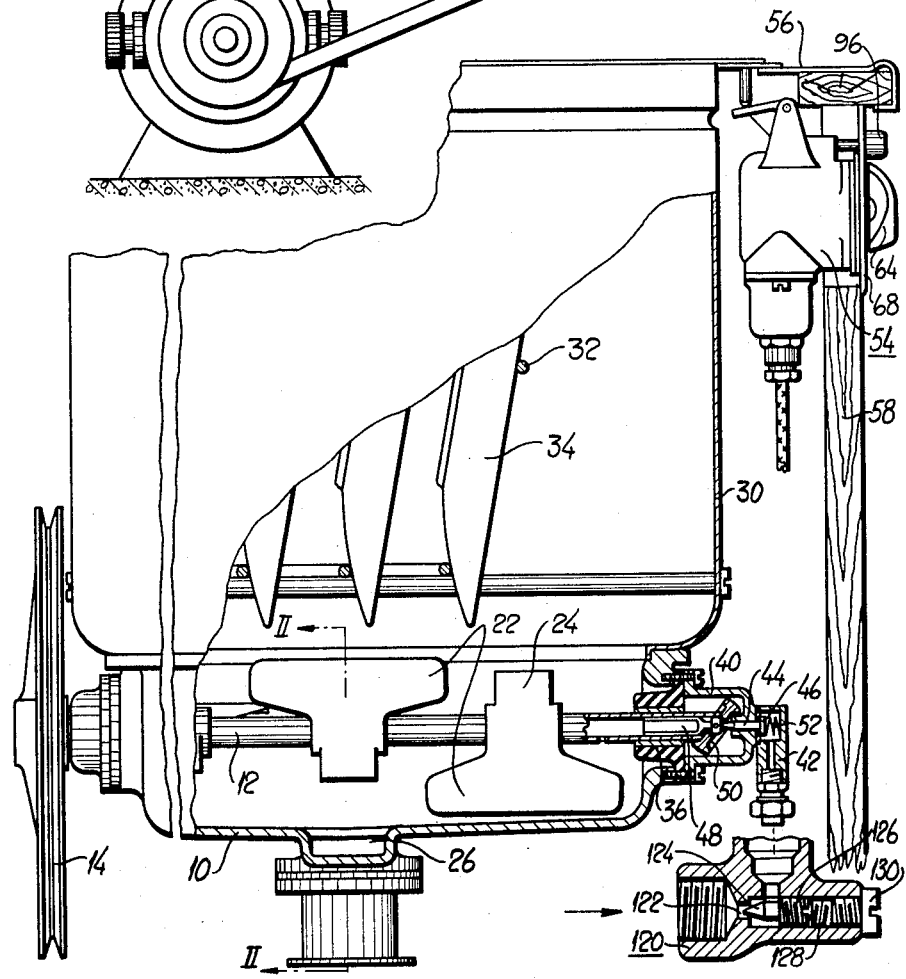

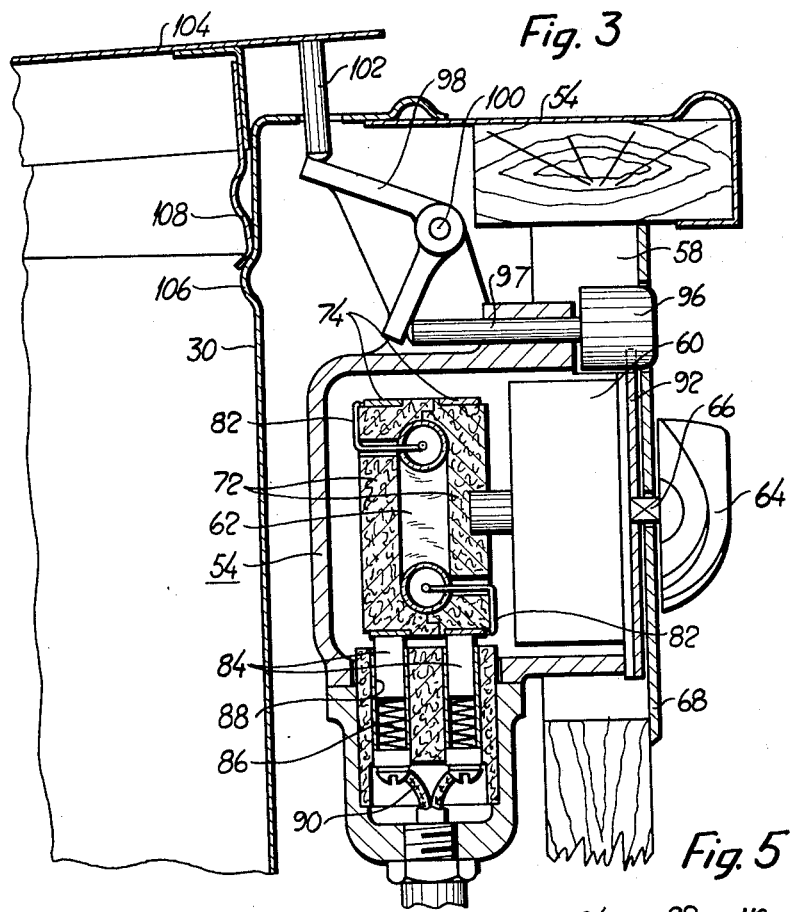
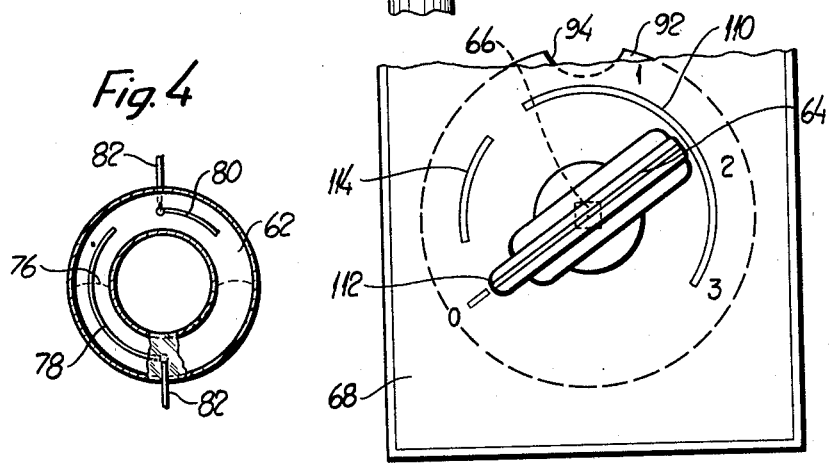

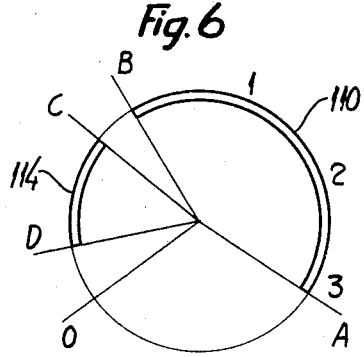
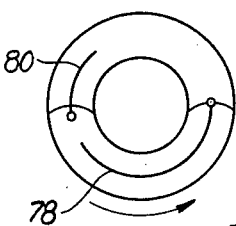
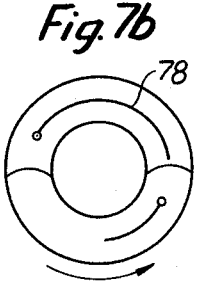
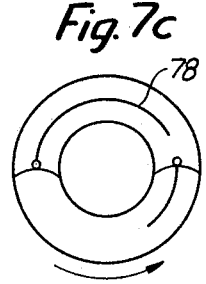
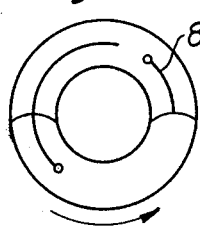
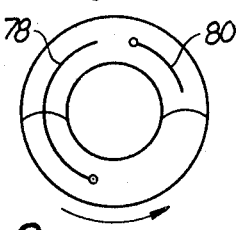
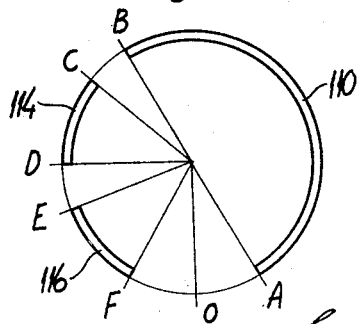

2,730,114

AUTOMATIC DISH-WASHING MACHINE AND CONTROL MECHANISM

Sven Börje Fredrik Carlstedt, Stockholm, Sweden

Application March 21, 1951, Serial No. 216,683

Claims priority, application Sweden March 23, 1950

15 Claims. (Cl. 134—57)

My invention relates to automatic dish-washing machine and control mechanism having automatically operable means to control the various cycles of the cleaning operation in sequential relation.

One object of my invention is to provide a machine permitting variable adjustment of the cycles of the entire cleaning operation.

I have observed that it is not necessary to vary the rinsing cycle in accordance with the kind and quantity of dirt adhering to the articles to be washed. Consequently another object of my invention is to provide a dish-washing machine having automatically operable means capable of being adjusted so as to vary the washing cycle, the rinsing period or periods, however, being maintained constant. In this manner, time and hot water are saved to a considerable degree in comparison with automatic time relays operating in predetermined cycles as known in the prior art, the discharge time of which is constant and consequently must be provided for the maximum of dirt.

Another object of my invention is to provide a machine having a timing device simple in construction and reliable in operation. In the prior art a contact member has been used for breaking the electric current conducted to different elements included in the machine, the contact member having been controlled by one or several cams. A further object of my invention is to provide a dish-washing machine having a contact member requiring a minimum number of movable parts but accurate in operation even if its adjustment from zero-position into operating position is performed in a direction opposite to that of normal movement.

My invention particularly relates to dish-washing machines having a member adapted to start the operation of the machine by a charging movement performed in one direction, the member thereupon while being retarded moving in the opposite direction, under which movement said member controls one washing cycle and at least one rinsing cycle, a discharge of washing liquid taking place between said cycles.

Still more particularly my invention relates to dish-washing machines of the type having a rotatable member driven by an electric motor and agitating washing liquid for movement relative to the articles to be washed. In connection therewith my invention has for a further object the provision of a machine of said type combining an extraordinarily good cleaning effect and an automatically controlled cleaning operation with simplicity in construction and as a consequence thereof relatively low costs of manufacturing even if the cleaning operation is divided into a washing cycle and one or a plurality of rinsing cycles. The invention makes possible the provision of a machine provided with a timing device having only one contact member, the current impulses produced by said member at the same time directly or indirectly causing the required adjustments of the different operative elements of the machine.

Further objects and advantages of the invention will be apparent from the following description considered in connection with the accompanying drawings, which form a part of this specification, and of which:

Fig. 1 is an elevational view with parts broken away and in section of a dish-washing machine and Fig. 2 is a cross-section on the line II—II of Fig. 1.

Fig. 3 shows a portion of the machine in same section as in Fig. 1 but on an enlarged scale.

Fig. 4 is a side view, partly in section, of a mercury switch.

Fig. 5 is a front view of a detail of Fig. 3.

Fig. 6 is a diagrammatical representation of the cleaning operation divided into cycles.

Figs. 7a to 7e are diagrammatic presentations of the adjustment of the mercury switch during the several cycles of operation of the machine.

Fig. 8 is a diagrammatical representation of the cycles of a dish-washing operation according to a modification.

Referring to the drawings, 10 designates a lower container or part of the machine having a shape resembling a trough and suitably being made of cast metal with a relatively great wall thickness. In the part 10 is mounted a shaft 12, which outside of the machine may carry a pulley 14, a belt 20 passing about said pulley and a smaller pulley 16 of a driving motor 18. On the shaft 12 there are rigidly secured a number of impeller members 22. In the illustrated embodiment three members 22 are disposed in succession along the length of the shaft but are displaced in relation to one another at angles of 120°. The impeller members 22 are statically balanced by counter-balances 24. In the lower portion of the container 10 is a drain 26 which preferably is permanently open and extends in a tangential or substantially tangential backward direction in relation to the direction of movement of the liquid as indicated by the arrow 28 in Fig. 2. The motor 18 may be of the series type, i. e. of a construction such that the speed of revolution of the shaft 12 is reduced in proportion to an increase in the load.

Above the lower container 10 is located a container 30 for the articles to be washed, which suitably is made of relatively thin sheet plate and is of considerably larger height and width than the lower container. The shaft 12 may be displaced somewhat in relation to the center line of the container for the articles to be washed, as will be seen from Figs. 1 and 2, the wall of the lower container opposite to said center line preferably extending in a sloping direction towards the horizontal plane. The articles to be washed, for example plates 34, are located in the container 30 on particular stands or baskets 32.

The shaft 12 is mounted at opposite ends in bearings 36 which preferably are water lubricated. Outside the bearing 36 as shown on the right is arranged a housing 40 rigidly connected with the lower container 10 onto which is secured a valve box 42 adapted to be connected to a water supply conduit. The supply of water from the valve box 42 to the interior of the machine is effected through a conduit 44 located in the housing 40 and controlled by a valve body 46. Said valve body has a portion suitably shaped with a quadrangular cross-section entering the housing and abutting against a driver 48 rotatable with shaft 12 but displaceable axially thereof. The driver 48 carries a flywheel body 50 which with the shaft 12 at rest takes the position shown in Fig. 1, the valve body 46 then being in closed position. When the shaft 12 is rotating, the flywheel body because of the influence of centrifugal force will take a position at right angles or substantially at right angles to the axis of the shaft and thereby displace the valve body 46 against the action of a spring 52 into open position. By this structure the supply of water to the machine is controlled automatically depending on the speed of rotation of the shaft 12 by the motor 18.

A throttling valve is provided in the water supply conduit which in Fig. 1 is shown on a larger scale than the other parts of the machine and which is generally designated by 120. The valve has a restricted passage 122 entered by the conical point 124 of a set screw 126 threadedly received in a bore 128 provided in the valve body. Upon adjustment of the set screw 126 for obtaining the desired degree of throttling the bore may be sealed by a screw 130. The valve 120, which is fully described in my co-pending patent application Serial No. 121,940, now Patent No. 2,684,921 granted July 27, 1954, is intended to control the supply of liquid to the machine so as to cause the machine to operate during the whole or a substantial portion of the washing operation with less than its full quantity of liquid.

The timing device constructed in accordance with the invention and generally designated by 54 is disposed alongside one wall of the machine. When it is encased in a sink, it is suitably carried by the front wall 58 thereof. The main parts of the device are a clock work 60 and a mercury switch 62. The clock work is of a type capable of being adjusted to an arbitrarily predetermined running time. As clock works of this type are known per se, they will not be described here in detail. The winding of the clock work is accomplished by means of a turning button 64 secured to one end of a shaft 66 of suitable polygonal cross-section. A dial 68 located outside of the wall 58 is provided with marks indicating the zero-position and various washing periods which may be required and which are set out in time units, for example by "1," "2," and "3" as shown in Fig. 5. The shaft 66 carries the mercury switch 62 encased between two pieces 72 of insulating material. The pieces 72 are circular in cross section and slip rings 74 of conductive material are secured on the outer surface of each piece.

The mercury switch 62 has the shape of a hollow annular body filled with mercury up to the level indicated at 76. It further contains two contact wires 78, 80, of which the first named extends a greater angular distance than the second-named. Each of the contact wires is connected with a terminal wire 82 suitably passing through the glass envelope of the switch on diametrically opposite sides and connected to the slip rings 74 respectively. Contact brushes 84 slidably engage the slip rings 74 each of the brushes 84 being subjected to the action of a spring 86 and guided within a cylindrical housing 88 made of metal. Conductors 90 of a cable connected with the motor 18 or with a power supply from an electrical network are conductively secured to said housings.

The shaft 66 carries a disk 92 having a cylindrical outer surface provided with a notch 94 having a shape corresponding to that of a push-button 96 having a pin 97 guided within the covering of the timing device and adapted to act upon a bell crank lever 98 pivoted at 100. The one arm of said lever acts upon a pin 102 connected with the cover 104 of the machine. The wall of the upper container 30 has a recess 106, and the cover 104 is provided with a spring 108 having a bent portion presenting a shape corresponding to that of the recess 106. When the cover is pressed down the spring 108 catches the recess 106 and thus fixes the cover in its closing position. Upon inward movement of the button 96, the bell crank lever 98 is pressed against the pin 102 the movement of which lifts the cover 104 and releases the spring 108 from the recess 106. Such inward movement of the button 96 can take place only when the clock work 60 is in zero-position the notch 94 then being located in alignment with the button. In this position the clock work cannot be wound up. On the other hand, the disk 92 immobilizes the button 96 as soon as the button 64 is turned away from zero-position. For this reason the cover cannot be lifted off when the clock work has been wound up and the machine is in operation. Consequently it is impossible even by mistake to lift off the cover 104 when and as long as the cleaning operation is going on.

Figs. 6 and 7 represent the different switching positions taken by the mercury switch 62 during operation of the machine. When starting the machine the button 64 is turned from the zero-position illustrated in Fig. 5 to the position indicated in Figs. 5 and 6 by the arc 110 and limited in this latter figure by the lines A and B. When the articles to be washed are very dirty, the button 64 is adjusted for a longer washing cycle, i. e. nearer to the line A than is the case when the articles are less dirty. As long as the pointed portion 112 of the button 64 during the running of the clock work is moving between the lines A and B, the mercury switch keeps the switching position shown in Fig. 7a. Both contact wires 78 and 80 are in contact with the mercury, the motor thus receiving current. This state continues until the line B has passed the contact wire 78 then rising above the level of the mercury as shown in Fig. 7b, the supply of current being interrupted thereby. At the same moment the washing operation proper in the machine is finished which means that the dirt particles have been loosened from the articles which, however, are still wet from more or less dirty washing liquid. When the shaft 66 of the clock work and the button 64 pass over the space limited by the lines B and C in Fig. 6, the washing liquid is discharged through the drain 26 which is permanently open according to the embodiment illustrated. As soon as the point 112 of the button arrives at the line C the contact wire 78 again enters the mercury mass whereby the circuit is closed and the motor started anew. The clock work forcing the button point to pass over the space limited by the lines C and D, fresh rinsing liquid is supplied to the machine and the articles are rinsed with clean water for a predetermined and constant period. Fig. 7d illustrates the moment when the shorter contact wire 80 which earlier had been in uninterrupted contact with the mercury mass, is leaving the same which moment coincides with the line D of Fig. 6. The supply of current is again broken and consequently the motor put out of operation during the last running period of the clock work corresponding to the moving of the button point 112 between the lines D and O, i. e. to the position of the mercury switch shown in Fig. 7e.

When the clock work 60 is wound up, it is obvious that the motor starts when the position 7d has been reached whereupon the mercury switch has to pass through the interrupting space between the lines C and B. The mercury mass contained in the annular body 62 has proved, under the winding up of the clock work, to perform a kind of surge movement resulting in a passing of said short period which may be characterized as a deadlock, without causing the motor to alter its number of revolutions to any appreciable degree.

It is evident that no change of the torsional moment, required for the winding up of the clock work and applied to the button 64, will occur when the mercury contacts pass through the different switching steps.

The embodiment shown in Fig. 8 differs from the preceding one in the one respect only that the mercury switch is provided with an additional contact wire in such a manner as to produce two rinsing cycles corresponding to the arcs 114 and 116 of which the first in the same manner as described above is separated from the arc 110 representing the washing cycle by a space B—C corresponding to a period during which the motor is out of operation. The second rinsing operation which extends over the space E—F indicated by the arc 116 is separated from the rinsing operation 114 by a space D—E when the motor again is out of operation. Both rinsing operations may be equally long with respect to the time required therefor.

While several more or less specific embodiments of the invention have been shown, it is to be understood that this is for purpose of illustration only, and the invention is not to be limited thereby, but its scope is to be determined by the appended claims.

What I claim is:

1. In an automatic dishwashing machine, a container for receiving articles to be washed, a relatively large opening in the bottom of said container, a trough-like casing disposed below said container and communicating therewith through said opening, a shaft rotatably mounted in said casing and extending longitudinally thereof, impellers fixed to said shaft, a drain port in the bottom of said casing, a fluid supply conduit connected to said casing, a shut-off valve in said conduit, means for opening said valve upon rotation of said shaft and for shutting said valve when said shaft is at rest, electric drive means for said shaft whereby upon rotation thereof said valve will open to supply liquid to said casing, said impellers operating to circulate said liquid into contact with said articles to wash the same, the movement of said liquid by said drain port preventing discharge therethrough and upon stopping of said shaft said valve will close and said liquid will discharge through said drain port, control means for said machine including a switch comprising a hollow annular body disposed in a substantially vertical plane and mounted on said machine for rotation about a substantially horizontal axis, a body of mercury filling substantially one-half of said annular body, a first elongated contact disposed within said annular body, a second elongated contact of substantially less length than said first contact disposed within said annular body, one end of said contacts terminating at diametrically opposite points, a pair of slip rings carried by said annular body, a conductor connecting each slip ring with one of said contacts, brushes engaging said slip rings, said brushes being connected in series with the electric supply circuit to said drive means, clock mechanism for rotating said annular body and a finger engaging knob for winding said clock mechanism to operate for a predetermined period of time whereby upon winding said clock mechanism said annular body will rotate in one direction to immerse said contacts in said mercury and energize said drive means to rotate said impellers and open said valve, said clock mechanism rotating said annular body in the opposite direction, the rotation of said impellers continuing until one end of said first contact emerges from said mercury and said drive means is deenergized thereby completing the washing cycle, and permitting the liquid to drain from said container, the rotation of said annual body continuing until the opposite end of said first contact enters said mercury to again energize said drive means and start a rinsing cycle, said rinsing cycle continuing until said contact emerges from said mercury to again deenergize said drive means thus completing the washing operation.

2. In an automatic dishwashing machine, a container for receiving articles to be washed, a relatively large opening in the bottom of said container, a trough-like casing disposed below said container and communicating therewith through said opening, a shaft rotatably mounted in said casing and extending longitudinally thereof, impellers fixed to said shaft, a drain port in the bottom of said casing, a fluid supply conduit connected to said casing, a shut-off valve in said conduit, means for opening said valve upon rotation of said shaft and for shutting said valve when said shaft is at rest, electric drive means for said shaft whereby upon rotation thereof said valve will open to supply liquid to said casing, said impellers operating to circulate said liquid into contact with said articles to wash the same, the movement of said liquid by said drain port preventing discharge therethrough and upon stopping of said shaft said valve will close and said liquid will discharge through said drain port, control means for said machine including a switch comprising a hollow annular body disposed in a substantially vertical plane and mounted on said machine for rotation about a substantially horizonal axis, a body of mercury filling substantially one-half of said annular body, a first elongated contact disposed within said annular body, a second elongated contact of substantially less length than said first contact disposed within said annular body, one end of said contacts terminating at diametrically opposite points, means connecting said contacts in series with the electric supply circuit for said drive means, clock mechanism for rotating said annular body and a finger engaging knob for winding said clock mechanism to operate for a predetermined period of time whereby upon winding said clock mechanism said annular body will rotate in one direction to immerse said contacts in said mercury and energize said drive means to rotate said impellers and open said valve, said clock mechanism rotating said annular body in the opposite direction, the rotation of said impellers continuing until one end of said first contact emerges from said mercury and said drive means is deenergized thereby completing the washing cycle and permitting the liquid to drain from said container, the rotation of said annular body continuing until the opposite end of said first contact enters said mercury to again energize said drive means and start a rinsing cycle, said rinsing cycle continuing until said second contact emerges from said mercury to again deenergize said drive means thus completing the washing operation.

3. In an automatic dishwashing machine, a container for receiving articles to be washed, a relatively large opening in the bottom of said container, a troughlike casing disposed below said container and communicating therewith through said opening, a shaft rotatably mounted in said casing and extending longitudinally thereof, impellers fixed to said shaft, a drain port in the bottom of said casing, a fluid supply conduit connected to said casing, a shut-off valve in said conduit, means for opening said valve upon rotation of said shaft and for shutting said valve when said shaft is at rest, electric drive means for said shaft whereby upon rotation thereof said valve will open to supply liquid to said casing, said impellers operating to circulate said liquid into contact with said articles to wash the same, the movement of said liquid by said drain port preventing discharge therethrough, and upon stopping of said shaft said valve will close and said liquid will discharge through said drain port, control means for said machine including a switch comprising a hollow annular body disposed in a substantially vertical plane and mounted on said machine for rotation about a substantially horizontal axis, a body of mercury in said annular body, a first elongated contact disposed within said annular body, a second elongated contact of substantially less length than said first contact disposed within said annular body, one end of said contact terminating at diametrically opposite points, means connecting said contacts in series with the electric supply circuit for said drive means, clock mechanism for rotating said annular body and a finger engaging knob for winding said clock mechanism to operate for a predetermined period of time whereby upon winding said clock mechanism said annular body will rotate in one direction to immerse said contacts in said mercury and energize said drive means to rotate said impellers and open said valve, said clock mechanism rotating said annular body in the opposite direction, the rotation of said impellers continuing until one end of said first contact emerges from said mercury and said drive means is deenergized thereby completing the washing cycle and permitting the liquid to drain from said container, the rotation of said annular body continuing until the opposite end of said first contact enters said mercury to again energize said drive means and start a rinsing cycle, said rinsing cycle continuing until said second contact emerges from said mercury to again deenergize said drive means thus completing the washing operation.

4. In an automatic dishwashing machine, a container for receiving articles to be washed, a relatively large opening in the bottom of said container, a troughlike casing disposed below said container and communicating therewith through said opening, a shaft rotatably mounted in said casing and extending longitudinally thereof, impellers fixed to said shaft, a drain port in the bottom of said casing, a fluid supply conduit connected to said casing, a shut-off valve in said conduit, means for opening said valve upon rotation of said shaft and for shutting said valve when said shaft is at rest, electric drive means for said shaft whereby upon rotation thereof said valve will open to supply liquid to said casing, said impellers operating to circulate said liquid into contact with said articles to wash the same, the movement of said liquid by said drain port preventing discharge therethrough and upon stopping of said shaft said valve will close and said liquid will discharge through said drain port, control means for said machine including a switch comprising a hollow annular body disposed in a substantially vertical plane and mounted on said machine for rotation about a substantially horizontal axis, a body of mercury in said annular body, a first elongated contact disposed within said annular body, a second elongated contact of substantially less length than said first contact disposed within said annular body, means connecting said contacts in series with the electric supply circuit for said drive means, clock mechanism for rotating said annular body and a finger engaging knob for winding said clock mechanism to operate for a predetermined period of time whereby upon winding said clock mechanism said annular body will rotate in one direction to immerse said contacts in said mercury and energize said drive means to rotate said impellers and open said valve, said clock mechanism rotating said annular body in the opposite direction, the rotation of said impellers continuing until one end of said first contact emerges from said mercury and said drive means is deenergized thereby completing the washing cycle and permitting the liquid to drain from said container, the rotation of said annular body continuing until the opposite end of said first contact enters said mercury to again energize said drive means and start a rinsing cycle, said rinsing cycle continuing until said second contact emerges from said mercury to again deenergize said drive means thus completing the washing operation.

5. In an automatic dishwashing machine, a container for receiving articles to be washed, a relatively large opening in the bottom of said container, a trough-like casing disposed below said container and communicating therewith through said opening, a shaft rotatably mounted in said casing and extending longitudinally thereof, impellers fixed to said shaft, a drain port in the bottom of said casing, a fluid supply conduit connected to said casing, a shut-off valve in said conduit, means for opening said valve upon rotation of said shaft and for shutting said valve when said shaft is at rest, electric drive means for said shaft whereby upon rotation thereof said valve will open to supply liquid to said casing, said impellers operating to circulate said liquid into contact with said articles to wash the same, the movement of said liquid by said drain port preventing discharge therethrough, and upon stopping of said shaft said valve will close and said liquid will discharge through said drain port, control means for said machine including a switch comprising a hollow annular body disposed in a substantially vertical plane and mounted on said machine for rotation about a substantially horizontal axis, a body of mercury in said annular body, a first elongated contact disposed within said annular body, a second elongated contact of substantially less length than said first contact disposed within said annular body, means connecting said contacts in series with the electric supply circuit for said drive means, timing mechanism for rotating said annular body and a finger engaging knob for setting said timing mechanism to operate for a predetermined period of time whereby upon setting said timing mechanism said annular body will rotate in one direction to immerse said contacts in said mercury and energize said drive means to rotate said impellers and open said valve, said timing mechanism rotating said annular body in the opposite direction, the rotation of said impellers continuing until one end of said first contact emerges from said mercury and said drive means is deenergized thereby completing the washing cycle and permitting the liquid to drain from said container, the rotation of said annular body continuing until the opposite end of said first contact enters said mercury to again energize said drive means and start a rinsing cycle, said rinsing cycle continuing until said second contact emerges from said mercury to again deenergize said drive means thus completing the washing operation.

6. In an automatic dishwashing machine, a container for receiving articles to be washed, a relatively large opening in the bottom of said container, a troughlike casing disposed below said container and communicating therewith through said opening, a shaft rotatably mounted in said casing and extending longitudinally thereof, impellers fixed to said shaft, a drain port in the bottom of said casing, a fluid supply conduit connected to said casing, a shut-off valve in said conduit, means for opening said valve upon rotation of said shaft and for shutting said valve when said shaft is at rest, electric drive means for said shaft whereby upon rotation thereof said valve will open to supply liquid to said casing, said impellers operating to circulate said liquid into contact with said articles to wash the same, the movement of said liquid by said drain port preventing discharge therethrough and upon stopping of said shaft said valve will close and said liquid will discharge through said drain port, control means for said machine including a switch comprising a hollow annular body disposed in a substantially vertical plane and mounted on said machine for rotation about a substantially horizontal axis, a body of mercury in said annular body, a first elongated contact disposed within said annular body, a second elongated contact disposed within said annular body, means connecting said contacts in series with the electric supply circuit for said drive means, timing mechanism for rotating said annular body and a finger engaging knob for setting said timing mechanism to operate for a predetermined period of time whereby upon setting said timing mechanism said annular body will rotate in one direction to immerse said contacts in said mercury and energize said drive means to rotate said impellers and open said valve, said timing mechanism rotating said annular body in the opposite direction, the rotation of said impellers continuing until one end of said first contact emerges from said mercury and said drive means is deenergized thereby completing the washing cycle and permitting the liquid to drain from said container, the rotation of said annular body continuing until the opposite end of said first contact enters said mercury to again energize said drive means and start a rinsing cycle, said rinsing cycle continuing until said second contact emerges from said mercury to again deenergize said drive means thus completing the washing operation.

7. In an automatic dishwashing machine, a container for receiving articles to be washed, a relatively large opening in the bottom of said container, a troughlike casing disposed below said container and communicating therewith through said opening, a shaft rotatably mounted in said casing and extending longitudinally thereof, impellers fixed to said shaft, a drain port in the bottom of said casing, a fluid supply conduit connected to said casing, a shut-off valve in said conduit, means for opening said valve upon rotation of said shaft and for shutting said valve when said shaft is at rest, electric drive means for said shaft whereby upon rotation thereof said valve will open to supply liquid to said casing, said impellers operating to circulate said liquid into contact with said articles to wash the same, the movement of said liquid by said drain port preventing discharge therethrough and upon stopping of said shaft said valve will close and said liquid will discharge through said drain port, control means for said machine including a switch comprising a hollow annular body disposed in a substantially vertical plane and mounted on said machine for rotation about a substantially horizontal axis, a body of mercury in said annular body, a first elongated contact disposed within said annular body, a second elongated contact disposed within said annular body, means connecting said contacts in series with the electric supply circuit for said drive means, timing mechanism for rotating said annular body for a predetermined period of time, means for setting said timing mechanism whereby said annular body will rotate in one direction to immerse said contacts in said mercury and energize said drive means to rotate said impellers and open said valve, said timing mechanism rotating said annular body in the opposite direction, the rotation of said impellers continuing until one end of said first contact emerges from said mercury and said drive means is deenergized thereby completing the washing cycle and permitting the liquid to drain from said container, the rotation of said annular body continuing until the opposite end of said first contact enters said mercury to again energize said drive means and start a rinsing cycle, said rinsing cycle continuing until said second contact emerges from said mercury to again deenergize said drive means thus completing the washing operation.

8. In an automatic dishwashing machine, a container for receiving articles to be washed, a relatively large opening in the bottom of said container, a troughlike casing disposed below said container and communicating therewith through said opening, a shaft rotatably mounted in said casing and extending longitudinally thereof, impellers fixed to said shaft, a drain port in the bottom of said casing, a fluid supply conduit connected to said casing, a shut-off valve in said conduit, means for opening said valve upon rotation of said shaft and for shutting said valve when said shaft is at rest, electric drive means for said shaft whereby upon rotation thereof said valve will open to supply liquid to said casing, said impellers operating to circulate said liquid into contact with said articles to wash the same, the movement of said liquid by said drain port preventing discharge therethrough and upon stopping of said shaft said valve will close and said liquid will discharge through said drain port, control means for said machine including a switch, timing means for actuating said switch, means for setting said timing means to close said switch and energize said drive means, said timing means operating to open said switch and deenergize said drive means thereby completing the washing cycle and permitting liquid to drain from said container, said timing means again closing said switch to energize said drive means and start a rinsing cycle, said rinsing cycle continuing until said timing means again opens said switch to again deenergize said drive means thus completing the washing operation.

9. A control means for electrical apparatus including a switch comprising a hollow annular body disposed in a substantially vertical plane and mounted for rotation about a substantially horizontal axis, a body of mercury filling substantially one-half of said annular body, a first elongated contact disposed within said annular body, a second elongated contact of substantially less length than said first contact disposed within said annular body, one end of said contacts terminating at diametrically opposite points, a pair of slip rings carried by said annular body, a conductor connecting each slip ring with one of said contacts, brushes engaging said slip rings, said brushes being connected in series with the electrical supply circuit for said apparatus, clock mechanism for rotating said annular body and a finger engaging knob for winding said clock mechanism to operate for a predetermined period of time whereby upon winding said clock mechanism said annular body will rotate in one direction to immerse said contacts in said mercury and energize said apparatus, said clock mechanism rotating said annular body in the opposite direction, said apparatus remaining energized until one end of said first contact emerges from said mercury to deenergize said apparatus, the rotation of said annular body continuing until the opposite end of said first contact enters said mercury to again energize said apparatus, said apparatus remaining energized until said second contact emerges from said mercury to again deenergize said apparatus thus completing the operating cycle.

10. A control means for electrical apparatus including a switch comprising a hollow annular body disposed in a substantially vertical plane and mounted for rotation about a substantially horizontal axis, a body of mercury filling substantially one-half of said annular body, a first elongated contact disposed within said annular body, a second elongated contact of substantially less length than said first contact disposed within said annular body, one end of said contacts terminating at diametrically opposite points, means connecting said contacts in series with the electrical supply circuit for said apparatus, clock mechanism for rotating said annular body and a finger engaging knob for winding said clock mechanism to operate for a predetermined period of time whereby upon winding said clock mechanism said annular body will rotate in one direction to immerse said contacts in said mercury and energize said apparatus, said clock mechanism rotating said annular body in the opposite direction, said apparatus remaining energized until one end of said first contact emerges from said mercury to deenergize said apparatus, the rotation of said annular body continuing until the opposite end of said first contact enters said mercury to again energize said apparatus, said apparatus remaining energized until said second contact emerges from said mercury to again deenergize said apparatus thus completing the operating cycle.

11. A control means for electrical apparatus including a switch comprising a hollow annular body disposed in a substantially vertical plane and mounted for rotation about a substantially horizontal axis, a body of mercury in said annular body, a first elongated contact disposed within said annular body, a second elongated contact of substantially less length than said first contact disposed within said annular body, one end of said contacts terminating at diametrically opposite points, means connecting said contacts in series with the electrical supply circuit for said apparatus, clock mechanism for rotating said annular body and a finger engaging knob for winding said clock mechanism to operate for a predetermined period of time whereby upon winding said clock mechanism said annular body will rotate in one direction to immerse said contacts in said mercury and energize said apparatus, said clock mechanism rotating said annular body in the opposite direction, said apparatus remaining energized until end of said first contact emerges from said mercury to deenergize said apparatus, the rotation of said annular body continuing until the opposite end of said first contact enters said mercury to again energize said apparatus, said apparatus remaining energized until said second contact emerges from said mercury to again deenergize said apparatus thus completing the operating cycle.

12. A control means for electrical apparatus including a switch comprising a hollow annular body disposed in a substantially vertical plane and mounted for rotation about a substantially horizontal axis, a body of mercury in said annular body, a first elongated contact disposed within said annular body, a second elongated contact disposed within said annular body, one end of said contacts terminating at diametrically opposite points, means connecting said contacts in series with the electrical supply circuit for said apparatus, clock mechanism for rotating said annular body and a finger engaging knob for winding said clock mechanism to operate for a predetermined period of time whereby upon winding said clock mechanism said annular body will rotate in one direction to immerse said contacts in said mercury and energize said apparatus, said clock mechanism rotating said annular body in the opposite direction, said apparatus remaining energized until one end of said first contact emerges from said mercury to deenergize said apparatus, the rotation of said annular body continuing until the opposite end of said first contact enters said mercury to again energize said apparatus, said apparatus remaining energized until said second contact emerges from said mercury to again deenergize said apparatus thus completing the operating cycle.

13. A control means for electrical apparatus including a switch comprising a hollow annular body disposed in a substantially vertical plane and mounted for rotation about a substantially horizontal axis, a body of mercury in said annular body, a first elongated contact disposed within said annular body, a second elongated contact disposed within said annular body, means connecting said contacts in series with the electrical supply circuit for said apparatus, clock mechanism for rotating said annular body and a finger engaging knob for winding said clock mechanism to operate for a predetermined period of time whereby upon winding said clock mechanism said annular body will rotate in one direction to immerse said contacts in said mercury and energize said apparatus, said clock mechanism rotating said annular body in the opposite direction, said apparatus remaining energized until one end of said first contact emerges from said mercury to deenergize said apparatus, the rotation of said annular body continuing until the opposite end of said first contact enters said mercury to again energize said apparatus, said apparatus remaining energized until said second contact emerges from said mercury to again deenergize said apparatus thus completing the operating cycle.

14. A control means for electrical apparatus including a switch comprising a hollow annular body disposed in a substantially vertical plane and mounted for rotation about a substantially horizontal axis, a body of mercury in said annular body, a first elongated contact disposed within said annular body, a second elongated contact disposed within said annular body, means connecting said contacts in series with the electrical supply circuit for said apparatus, timing mechanism for rotating said annular body and a finger engaging knob for setting said timing mechanism to operate for a predetermined period of time whereby upon setting said timing mechanism said annular body will rotate in one direction to immerse said contacts in said mercury and energize said apparatus, said timing mechanism rotating said annular body in the opposite direction, said apparatus remaining energized until one end of said first contact emerges from said mercury to deenergize said apparatus, the rotation of said annular body continuing until the opposite end of said first contact enters said mercury to again energize said apparatus, said apparatus remaining energized until said second contact emerges from said mercury to again deenergize said apparatus thus completing the operating cycle.

15. A control means for electrical apparatus including a switch comprising a hollow annular body disposed in a substantially vertical plane and mounted for rotation about a substantially horizontal axis, a body of mercury in said annular body, a first elongated contact disposed within said annular body, a second elongated contact disposed within said annular body, means connecting said contacts in series with the electrical supply circuit for said apparatus, timing mechanism for rotating said annular body for a predetermined period of time, means for setting said timing mechanism whereby said annular body will rotate in one direction to immerse said contacts in said mercury and energize said apparatus, said timing mechanism rotating said annular body in the opposite direction, said apparatus remaining energized until one end of said first contact emerges from said mercury to deenergize said apparatus, the rotation of said annular body continuing until the opposite end of said first contact enters said mercury to again energize said apparatus, said apparatus remaining energized until said second contact emerges from said mercury to again deenergize said apparatus thus completing the operating cycle.

References Cited in the file of this patent

UNITED STATES PATENTS

| | | |
|---|---|---|
| 1,724,910 | Cromwell | Aug. 20, 1929 |
| 1,995,318 | Merrill | Mar. 26, 1935 |
| 2,025,571 | Clark | Dec. 24, 1935 |
| 2,030,092 | Benson | Feb. 11, 1936 |
| 2,142,928 | Walker | Jan. 3, 1939 |
| 2,155,271 | Jones | Apr. 18, 1939 |
| 2,200,127 | Stoddard et al. | May 7, 1940 |
| 2,390,757 | Varis | Dec. 11, 1945 |
| 2,492,288 | Hollerith | Dec. 27, 1949 |
| 2,517,109 | Hollerith | Aug. 1, 1950 |
| 2,575,704 | Clark | Nov. 20, 1951 |

FOREIGN PATENTS

| | | |
|---|---|---|
| 202,154 | Switzerland | Dec. 31, 1938 |